(12) United States Patent
Wantling et al.

(10) Patent No.: US 7,473,713 B2
(45) Date of Patent: *Jan. 6, 2009

(54) ADDITIVES FOR WATER-RESISTANT GYPSUM PRODUCTS

(75) Inventors: Steven Wantling, Brandon, MS (US); Bonnie S. Zepka, Louisville, KY (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 10/525,917

(22) PCT Filed: Jun. 5, 2003

(86) PCT No.: PCT/US03/17771

§ 371 (c)(1), (2), (4) Date: Feb. 25, 2005

(87) PCT Pub. No.: WO2004/033581

PCT Pub. Date: Apr. 22, 2004

(65) Prior Publication Data

US 2005/0250858 A1 Nov. 10, 2005

Related U.S. Application Data

(60) Provisional application No. 60/417,770, filed on Oct. 11, 2002, provisional application No. 60/454,168, filed on Mar. 12, 2003.

(51) Int. Cl.
- *B01F 3/08* (2006.01)
- *C08L 91/06* (2006.01)
- *C08L 95/00* (2006.01)
- *C08L 3/00* (2006.01)
- *D21H 17/60* (2006.01)
- *C04B 24/38* (2006.01)
- *C09D 195/00* (2006.01)
- *C09D 103/04* (2006.01)
- *D21H 21/16* (2006.01)
- *D21H 17/24* (2006.01)

(52) U.S. Cl. .......... 516/38; 106/162.1; 106/18.29; 106/781

(58) Field of Classification Search .......... 516/38; 106/162.1, 18.29, 781
See application file for complete search history.

(56) References Cited

U.S. PATENT DOCUMENTS

| | | | |
|---|---|---|---|
| 2,699,414 A | 1/1955 | Seibe et al. | 154/45.9 |
| 3,869,414 A | 3/1975 | Campbell | 260/6 |
| 3,891,463 A | 6/1975 | Williams | 106/85 |
| 3,935,021 A | 1/1976 | Greve et al. | 106/111 |
| 4,019,920 A | 4/1977 | Burkard et al. | 106/114 |
| 4,042,409 A | 8/1977 | Terada et al. | 106/111 |
| 4,094,694 A | 6/1978 | Long | 106/111 |
| 4,174,230 A | 11/1979 | Hashimoto et al. | 106/109 |
| 4,239,716 A | 12/1980 | Ishida et al. | 264/86 |
| 4,328,178 A | 5/1982 | Kossatz | 264/69 |
| 4,392,896 A | 7/1983 | Sakakibara | 150/39 |
| 4,421,704 A | 12/1983 | Reily | 264/133 |
| 4,645,548 A | 2/1987 | Take et al. | 156/39 |
| 4,734,163 A | 3/1988 | Eberhardt et al. | 162/181.3 |
| 4,748,196 A | 5/1988 | Kuroda et al. | 524/43 |
| 5,009,269 A | 4/1991 | Moran et al. | 166/293 |
| 5,120,355 A | 6/1992 | Imai | 106/2 |
| 5,320,677 A | 6/1994 | Baig | 106/780 |
| 5,482,551 A | 1/1996 | Morris et al. | 106/772 |
| 5,695,553 A | 12/1997 | Claret et al. | 106/778 |
| 5,922,447 A | 7/1999 | Baig | 428/292.7 |
| 5,968,237 A | 10/1999 | Sinnige | 106/2 |
| 5,980,628 A | 11/1999 | Hjelmeland et al. | 106/778 |
| 6,010,596 A * | 1/2000 | Song | 162/158 |
| 6,066,201 A | 5/2000 | Wantling | 106/271 |
| 6,162,839 A | 12/2000 | Klauck et al. | 521/83 |
| 6,165,261 A | 12/2000 | Wantling | 106/778 |
| 6,172,122 B1 | 1/2001 | Lawate et al. | 516/109 |
| 6,231,656 B1 | 5/2001 | Dekerf et al. | 106/38.25 |
| 6,251,979 B1 | 6/2001 | Luongo | 524/423 |
| 6,287,495 B1 | 9/2001 | Rosthauser | 264/109 |
| 7,294,189 B2 * | 11/2007 | Wantling | 106/164.3 |

FOREIGN PATENT DOCUMENTS

WO  WO 03/004433 A1  1/2003

OTHER PUBLICATIONS

International Search Report dated Oct. 2, 2003 PCT/US03/17771.

* cited by examiner

*Primary Examiner*—Daniel S Metzmaier

(57) ABSTRACT

Emulsions are provided which are useful in imparting water-resistance to gypsum products. In one embodiment, the emulsions comprise at least one wax, an alkyl phenol, a salt of polynaphthalenesulfonic acid, and a complexed starch. Emulsions of this embodiment may be added to hot, even boiling, water without the emulsion separating or curdling. The emulsions of the present invention are stable for extended periods of time when stored at room temperature and do not require the addition of a bactericide. The emulsions of the present invention are pourable liquids at room temperature.

21 Claims, No Drawings

ADDITIVES FOR WATER-RESISTANT GYPSUM PRODUCTS

This application claims the benefit of U.S. Provisional Application No. 60/417,770, filed 11 Oct. 2002, and U.S. Provisional Application No. 60/454,168, filed 12 Mar. 2003.

FIELD OF THE INVENTION

The present invention relates to an additive useful in improving the water-resistance of gypsum products. The present invention also relates to an emulsion which includes a wax or a combination of waxes, an alkyl phenol, a salt of polynaphthalenesulfonic acid, and a complexed starch, the emulsion useful in improving the water resistance of gypsum products. The present invention further relates to a method of making the emulsion.

BACKGROUND OF THE INVENTION

Certain properties of gypsum (calcium sulfate dehydrate) make it very popular for use in making industrial and building products; especially gypsum board. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

In the making of gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

It is also important to the manufacture of gypsum board, that the gypsum slurry be capable of being foamed to a limited extent. Foamability refers to this ability to be foamed. When the gypsum slurry and paper substrate are passed though the sizing rollers, a certain amount of the gypsum slurry must back flow and accumulate in the rollers nip so that a steady flow of gypsum is delivered to the sizing rollers. Foamability is important to this ability of the gypsum slurry to back flow at the rollers nip. Forming plates may be used, eliminating the use of a master roll, but foam is important to control density of the finished product.

Because of the continuous nature of a gypsum board manufacturing process wherein the gypsum slurry flows onto a substrate which then passes through sizing rollers, the extent to which the gypsum slurry flows after it is sized is critical to maintaining the finished product dimensions of the gypsum board. The time at which the gypsum slurry ceases its flow is referred to as the pre-set time. Therefore, pre-set time is an important property of the gypsum slurry. The set time of the gypsum slurry is also an important property. The set time refers to the amount of time it takes the gypsum slurry to be dried, under heat, to the finished, solid gypsum board. As is well known in the art, in a continuous gypsum board manufacturing process, it is important that the gypsum slurry possess a consistent set time.

Gypsum board absorbs water, which reduces the strength of the wallboard. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Actual tests have demonstrated that when a 2 inch by 4 inch cylinder of gypsum board core material was immersed in water at about 70° F., the cylinder showed a water absorption of 36% after immersion for 40 minutes.

Previous attempts to provide water-resistant properties to gypsum board include incorporation of asphalt, metallic soaps, resins, and wax additives into a aqueous gypsum slurry. The resulting materials were difficult to use and the core properties difficult to control. Polysiloxane-based systems have also been used in attempts to impart water-resistance to gypsum board. However, the polysiloxane-based systems are both expensive and difficult to use. A finished gypsum product has also been coated with water-resistant films or coatings. One specific example of a past attempt to provide a water-resistant gypsum product is the spraying of a molten paraffin, wax or asphalt into an aqueous gypsum slurry.

Another example of a prior art attempt to provide a water-resistant gypsum product is the addition of an emulsion of wax, such as paraffin wax, and asphalt, in the relative proportions of from about 1 part to about 10 parts of asphalt per part of wax to the aqueous gypsum slurry. Since the asphalt is a relatively poor solvent for paraffin wax and similar wax at ordinary temperatures, the solution formed at high temperatures tends on cooling to deposit microscopic wax crystals on the asphalt-wax surface.

Polyvinyl alcohol has been used in an attempt to provide a room temperature system for use in adding water-resistant properties to gypsum. However, the polyvinyl alcohol system tends to rapidly separate and thus typically requires continuous mixing prior to use. The inherent instability of the polyvinyl alcohol systems tends to produce stratification of the compounds in the formulation. Therefore, the polyvinyl alcohol systems tend to be compositionally inconsistent. In addition, because of destabilization into different phases, there is also the potential for bacterial growth.

Accordingly, there is a need for an additive which is useful in imparting water-resistance to gypsum products, and which is economical to apply. There is a need for a water-resistance additive which does not require the use of costly components such as polysiloxane. There is a need for a stable, water-resistance additive. There is a further need for a water-resistance additive which is stable at room temperate and which does not require heating prior to application to a gypsum solution. There is still a further need for a stable water-resistance additive which does not require continuous mixing or agitation to maintain its stability. There is yet a further need for a stable water-resistance additive which does not require the addition of a bactericide to control bacterial growth inherent in existing systems. Of course, such additives should perform these functions without affecting fluidity, foamability, pre-set time or set time.

Historically, products added to a gypsum slurry to impart a degree of water-resistance in the board manufacturing process have incorporated asphalt, molten wax, emulsified wax/asphalt, emulsified wax, and various silicone products. These prior art systems have all demonstrated shortfalls in any number of performance related areas. These shortfalls include, but are not limited to, inconsistent solids, instability of the emulsions, wide ranges in apparent viscosity, a caustic pH requiring hazardous labeling, health risks due to the evolution of hydrogen and hydrogen sulfide gases. An additive is needed that can address the aforementioned issues and impart water-resistance to a product.

It has been noted in earlier work that the incorporation of a generic starch species from corn, sago, wheat, rice, etc., with a complexing agent such as sodium borate in combination with other chemical compounds, specifically sodium lignosulfate, and $C_{24}$ and greater polymerized alkyl phenol and various waxes forms a nearly stable wax emulsion suitable for incorporation into a gypsum slurry to impart water-resistance. While this system shows significant advantages over previously available wax emulsions it to suffers from a number of deficiencies, including: degradation of the pH due to bacteriological activity resulting from the decomposition of the sodium lignosulfate in long-term storage, viscosity changes as temperature and age occur manifesting itself as a slight separation at the water/wax interface, and less than predictable use rates at the mixer due to the changes occurring singularly and in combination.

SUMMARY OF THE INVENTION

Embodiments of the present invention provide an additive emulsion and a method for making the emulsion that addresses the issues of water absorption, viscosity control, stability, and slurry fluidity.

In one embodiment, the present invention provides an emulsion including at least one wax, an alkyl phenol, a polynaphthalenesulfonic acid, an alkali metal hydroxide, and a complexed starch. The polynaphthalenesulfonic acid and the alkali metal hydroxide react to give a salt of polynaphthalenesulfonic acid. Emulsions of this embodiment may be added to hot, even boiling, water without the emulsion separating or curdling. The emulsions of the present invention are stable for extended periods of time when stored at room temperature and do not require the addition of a bactericide. The emulsions of the present invention are pourable liquids at room temperature. The emulsions of the present invention are useful in providing water-resistance to a gypsum product.

In another embodiment, the present invention provides a method for making an emulsion, including the steps of:

(a) mixing at least one wax and an alkyl phenol to provide a first pre-mix;

(b) mixing polynaphthalenesulfonic acid, an alkali metal hydroxide, water, and a complexed starch to provide a second pre-mix;

(c) combining the first pre-mix and the second pre-mix to provide a mixture; and (d) homogenizing the mixture.

The emulsions of the present invention are useful in providing water-resistance to a gypsum product.

The emulsions of the present invention are useful in imparting water-resistance to gypsum products. The emulsions of the present invention may also include a fire retardant. The emulsions of the present invention may be used in the manufacture of conventional gypsum board, composites made using gypsum, such as gypsum/fiber composites, and other gypsum products.

DETAILED DESCRIPTION OF THE INVENTION

There is provided in accordance with the principles of the present invention an emulsion which is useful in imparting water-resistance properties to gypsum products. The emulsions of the present invention may be added to mixtures of gypsum and water without adversely affecting properties of the mixture which are necessary to the manufacture of gypsum products such as gypsum board. Such properties include fluidity, foamability and set time.

In the manufacture of gypsum wallboard products it is important to impart water-resistance to the finished product, so as to limit the maximum water absorption realized by the wallboard in a defined board soak test. For example, American Standards for Testing Materials ASTM 1396 and sub parts thereof describe such a test.

It has been found that the generic starch compounds used in earlier work require cooking time temperatures to reach a gelation state at which a particular viscosity is achieved. It has further been noted that the initial viscosity moves through and continues to move through a number of ranges influenced by storage conditions and additive chemistry. This contributes to the unpredictable nature of these systems. It has been discovered that by utilizing starch compounds such as acid-modified, hydroxyethylated, oxidized, and/or cationic, in combination with a complexing agent and a salt of polynaphthalenesulfonic acid coupled with a polymerized alkyl phenol all in a correct relationship, that the noted deficiencies are corrected and a resulting wax emulsion having superior performance as a water absorption control additive is achieved. These newly discovered combinations provide a higher level of stability both at high temperature and low temperature, provide an unchanging and predictable viscosity, eliminate the need for the addition of biocides, needed in the former systems to control bacteriological activity, and provide an even higher level of water-resistance over other additive products.

It has further been discovered that borate compounds, molybdate compounds, and molybdenum compounds are surprisingly effective complexing agents. Examples of useful complexing agents include, but are not limited to, sodium borate (borax), magnesium borate, and other borate compounds; ammonium molybdate, sodium molybdate, magnesium molybdate, and other molybdate compounds; molybdenum disulfide and other molybdenum compounds.

The ratio of complexing agent (for example, sodium tetraborate decahydrate, sodium molybdate dihydrate, molybdenum disulfide, or other compounds) to the modified starch significantly influences the control of other necessary properties in the board/slurry process, i.e. foam support and slurry additive compatibility. This newly discovered chemistry eliminates the need for the sodium lignosulfate previously used as both a cosurfactant and a dispersing aid which therefore eliminates the need for a biocide to control biological activity.

It has further been discovered that these combinations and the ratios thereof are unique and necessary to formulate a stable and performing wax emulsion and that certain manufacturing processes must occur. The range of ratios of starch: borate, or starch:molybdate, or starch: molybdenum compound may range from about 4:1 to about 20:1 on a weight/weight basis.

Water, a complexing agent (that is, a borate compound, a molybdate compound, or a molybdenum compound) and a starch are first brought together in order to make the complexed starch useful in embodiments of the present invention. Next, polynaphthalenesulfonic acid and potassium hydroxide are added to the aqueous solution of completed starch. This mixture is brought to a temperature of about 185° F. to about 205° F. and held until the starch reaches its maximum state of gelation, which typically occurs in about 20 to about 30 minutes. The wax compounds are incorporated with the polymerized alkyl phenol and brought to a temperature of about 185° F. to about 205° F. Then, the wax phase is added to the water phase and reacted to form an in situ surfactant. A detergent/dispersant is formed by the combination and reaction of the polymerized alkyl phenol and the polynaphthalenesulfonic acid, which acts to modify the wax crystal and allows the wax crystals to resist plating and linking with themselves and instead remain in a disassociated state until they are transferred due to polarity to the gypsum. The reacted system is then passed through a homogenizer at a pressure of about 2,000 to about 4,000 psi and then cooled at a prescribed rate to control the stability and viscosity of the finished wax emulsion. The homogenized composition exits the homogenizer at a temperature of about 135° F. to about 145° F. The mixture is then cooled to about 80° F. to about 110° F. The cooling rate is controlled to avoid causing the wax to recrystallize and breakout of solution.

The incorporation of the polynaphthalenesulfonic acid promotes a negative charge to the gypsum crystal thus providing an active site for the wax to align and coat providing the water-resistant properties. Further, it is discovered that by utilizing the modified starch compounds in combination and proper ratios with other noted compounds, that a low viscosity system can be developed allowing a broader range of solids, from about 40% to about 60% by weight to be available and usable.

Preparation of Emulsions:

Emulsions were prepared by heating the wax and surfactants ("wax mixture") in one vessel and the water, complexing agent (a borate compound, a molybdate compound, or a molybdenum compound) and corn starch ("water mixture") in another vessel. Both mixtures were heated, with mixing, to about 185° F. (85° C.). Next, the wax mixture was poured into the water mixture under mixing. The resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

It is preferred that the homogenized mixture be cooled after the homogenization step. It is most preferable that the homogenized mixture be cooled from approximately 185° F. to about 100° F. This may be accomplished by running the homogenized mixture through a cooling coil immersed in water maintained at room temperature.

HLB Values:

The hydrophilic/lipophilic balance ("HLB") value describes the relationship of a compound to its solubility in water. An emulsifier having a low HLB value will tend to be oil soluble and one having a high HLB value will tend to be water soluble. Typically, a water soluble emulsifier or blends thereof are used to make an oil/water emulsion typical of those described herein, or to solubilize oils or waxes, or to obtain some measure of detergent action. Thus, the HLB value can be used to describe or select the proper emulsifier or emulsifier system.

Where two or more components are combined, the HLB value of the combination is the weighted average of the individual HLB values. The following formula may be used to calculate the HLB value of a combination of materials:

$$HLB(\text{combined}) = \frac{Q_1 \times (HLB_1) + Q_2 \times (HLB_2) + \ldots Q_n \times (HLB_n)}{Q_1 + Q_2 + \ldots Q_n};$$

where, $Q_1$=weight of material 1; $HLB_1$=HLB value of material 1
$Q_2$=weight of material 2; $HLB_2$=HLB value of material 2
$Q_n$=weight of material n; $HLB_n$=HLB value of material n Test Specimens:

Test specimens were made by mixing 50 grams of gypsum, 35.97 grams of water, and 1.92 grams of a specified emulsion. For the control, no emulsion was added. Gypsum, water and, if added, emulsion, were mixed together and left to stand for one minute. This mixture was then mixed for an additional 30 seconds. After this second mixing, the specimens were subjected to fluidity testing.

Fluidity Test:

The specimens mixed as provided above were poured out onto a flat surface and the diameter of the resulting patty was measured. The diameter of a patty is an index of the fluidity of the specimen. The larger the diameter, the more fluid the specimen.

Foamability Test

The foamability test is used to determine the affect of a wax emulsion on the stability of foam in a gypsum slurry. In this test, 0.60 grams of a commercially available foamant and 2 grams of wax emulsion are weighed out. The foamant and the emulsion are placed into a blender along with 100 grams of water. The mixture is blended for 20 seconds. At the end of this blending step, the foam is immediately poured from the blender cup into a tared 150 ml beaker to overflowing. Any excess is struck off the beaker. Any foam remaining in the blender cup is set aside. The foam density is determined by weighing the foam in the 150 ml beaker. Two minutes after the blending has stopped, any liquid in the remaining foam in the blender cup is drained and discarded. A clean, tared, 150 ml beaker is filled with the remaining foam to overflowing and the excess is struck off. A second foam density is determined as described above. For the emulsions of the present invention, foam densities were acceptable and ranged from about 40 to about 65 grams per 150 ml, for the measurements made at 20 seconds, and from about 10 to about 45 grams per 150 ml, for the measurements made at 2 minutes.

Water Absorption Test:

Patties made in the Fluidity Test were dried for at least 24 hours at 110° F. At the end of this time, the patties were weighed and the weight was recorded. The dried patties were then immersed in water for two hours. At the end of the two hour immersion, the patties were weighed and this wet weight was recorded. Percent water retention was then calculated based on the difference between these two recorded weights.

Materials:

Various sources of gypsum may be used in the compositions of the present invention. However, the amount of water required to hydrate a gypsum sample will vary with the purity of the sample.

Waxes useful in making the various embodiments of the present invention may be selected from any of the commercially known waxes which have a melting point of from about 120° F. to about 150°, and preferably from about 135° F. to about 145°. Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of $C_{36}$, that is a 36 carbon chain length, or greater.

In certain embodiments, it is useful to saponify one or more of the waxes. In this way, the saponified wax functions as an added surfactant. Waxes useful in this respect are limited to waxes having an acid value or a saponification value and a melting point greater than about 180° F. Saponification of such waxes may be accomplished by combining the wax with a strongly basic material such as sodium hydroxide or potassium hydroxide. Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamo-ceri mimbi wax, shellac, spermaceti wax, sugar cane wax, wool-lanolin wax, and others. The amount of strongly basic material needed to saponify a wax may be calculated based on the saponification value of the wax. For example, the saponification value divided by 1000 equals the grams of potassium hydroxide to add per gram of wax.

Starch used in the emulsions of the present invention is complexed starch. The starch may be complexed in situ, during manufacture of the emulsion, or the starch may be pre-complexed prior to being added to the emulsion. Starch is preferably complexed by mixing the starch with a complexing agent such as a borate compound, a molybdate compound or a molybdenum compound. For example, a preferred borate compound is sodium tetraborate decahydrate. For example, a preferred molybdate compound is ammonia hepta molybdate. For example, a preferred molybdenum compound is molybdenum disulfide. Other compounds useful in complexing starch include ammonium biborate, ammonium pentaborate, potassium pentaborate, potassium tetraborate, lithium tetraborate, and magnesium borate compounds; ammonium dimolybdate, ammonium heptamolybdate, barium molybdate, calcium molybdate, lithium molybdate, magnesium molybdate, sodium molybdate, and potassium molybdate; and other molybdenum compounds, and the like. The starch useful in making the complexed starch of the present invention includes, but is not limited to, corn, rice, wheat, potato, sago and other starches. The ratio of complexing agent (a borate compound, a molybdate compound, or a molybdenum compound) to starch is important to the functionality of the complexed starch in the emulsions. It has been found that the ratio may be as low as 1:20, of complexing agent (a borate compound, a molybdate compound, or a molybdenum compound) to starch on a weight per weight basis. The ratio may be as high as 1:3.5, however it has been found that at this ratio, and higher ratios, a greater amount of complexed starch is needed in the emulsion to maintain the balance of desired properties in the gypsum mixture and final gypsum product. These desired properties include fluidity, foamability, and water-resistance.

Incorporating alkyl phenols into the emulsions has been found important to achieving low water absorption in the final gypsum product. As used herein, "alkyl phenols" refer to phenolic compounds having a long chain alkyl group. The long chain alkyl group may be straight or branched. The long chain alkyl group may be $C_{24}$-$C_{34}$ (from 24 to 34 carbon chain length). Such alkyl phenols include long chain, $C_{24}$-$C_{34}$ (from 24 to 34 carbon chain length) polymerized methylene-coupled alkyl phenol, phenate salts, calcium phenates, long branched chain calcium alkyl phenols, long straight chain calcium alkyl phenols and complex polymers of maleic acid with and without an amine group substitution. One example of an alkyl phenol useful in the compositions of the present invention is described below.

| Identification No. | Description | Source |
|---|---|---|
| 319H | $C_{24}$-$C_{34}$ polymerized methylene-coupled alkyl phenol | Lubrizol Chem. Corp. Wycliffe, Ohio |

In certain embodiments which use a single wax additive, it has been found that a dual surfactant system provides a stable emulsion at both room temperature and elevated temperatures. Such stable emulsions may be added, for example, to hot or boiling water, without the emulsion separating or curdling. The dual surfactant system uses a unique ratio of the component surfactants to provide an HLB value within a range of about 8.9 to about 14. It is preferred that the component surfactants each have an HLB value greater than 6. One example of a dual surfactant system of the present invention is a combination of dodecylisopropanolamine benzene sulfonate and a nonionic ethoxylated aryl phenol. Dodecylisopropanolamine benzene sulfonate may be obtained from Unichema, Wilmington, Del., under the trade name SD1121. One nonionic ethoxylated aryl phenol is Ethox 2938, available from Ethox Corp., Greenville, S.C. Alternatively, an alkoxylated fatty acid ester may be combined with the of dodecylisopropanolamine benzene sulfonate to form the dual surfactant system. One alkoxylated fatty acid ester is Ethox 2914, also available from Ethox Corp., Greenville, S.C.

It has also been found that in certain embodiments of the present invention a dispersing aid, or fluidity modifier, is useful for the maintenance of the fluidity of the gypsum/emulsion mixture. Such dispersing agents are strong lipophiles, which are, consequently, good defoamers. One such dispersing agent is poly(oxy-1,2-ethanedyl), alpha-phenyl-omega-hydroxy styrenate.

Bactericides/fungicides can be included in the present invention. An example of a bactericide fungicide is META-SOL D3TA, which is 3,5-dimethyl-tetrahydro-1,3,5,2H-thiadiazine-2-thione. METASOL D3TA may be obtained from Ondo-Nalco, Houston, Tex.

A salt of polynaphthalenesulfonic acid is required by the present invention. An example of a polynaphthalenesulfonic acid is DISAL GPS. The polynaphthalenesulfonic acid and an alkali metal hydroxide are reacted to give a salt of the polynaphthalenesulfonic acid. DISAL GPS may be obtained from Handy Chemical, Montreal, Quebec, Canada.

Wax Emulsions Including Polynaphthalenesulfonic Acid

An emulsion can be formed by combining and homogenizing at least one wax, an alkyl phenol, a salt of polynaphthalenesulfonic acid, and a complexed starch. Table 1 below provides examples of emulsions made according to this embodiment. Also, there is provided results of testing the gypsum/emulsion mixture and gypsum product. All mixtures and homogenizations were made, and tests were performed, as described above.

TABLE 1

WAX EMULSIONS INCLUDING POLYNAPHTHALENESULFONIC ACID

| Component/ Parameter | (amount of Component, % by wt) | | | |
|---|---|---|---|---|
| | Emulsion A | Emulsion B | Emulsion C | Emulsion D |
| Wax 3816D | 33.00 | 33.00 | 36.00 | 38.00 |
| Montan Wax | 3.30 | 3.30 | 3.60 | 3.80 |

TABLE 1-continued

WAX EMULSIONS INCLUDING POLYNAPHTHALENESULFONIC ACID

| Component/ Parameter | (amount of Component, % by wt) | | | |
|---|---|---|---|---|
| | Emulsion A | Emulsion B | Emulsion C | Emulsion D |
| Alkyl Phenol | 0.50 | 0.50 | 0.50 | 0.50 |
| DISAL GPS | 1.00 | 1.00 | 1.20 | 1.50 |
| Water | 59.50 | 59.10 | 55.58 | 52.97 |
| Borax | 0.37 | 0.37 | 0.37 | 0.37 |
| Acid-modified C150 Starch | 1.60 | 1.60 | 1.60 | 1.60 |
| 45% KOH | 0.75 | 0.75 | 0.818 | 0.864 |
| METASOL D3TA | | 0.40 | 0.40 | 0.40 |
| % Water Absorbed | 0.5-5.0 | 0.5-5.0 | 0.5-5.0 | 0.5-5.0 |

The emulsions of Table 1 were mixed with water and gypsum is added to the water emulsion mixture. The water/emulsion/gypsum mixture is then formed into a test specimen as described above. The standard tests previously described are used to evaluate the properties of the test specimen. For example, test specimens were tested for percent water absorption and the range of values provided in Table 1 were measured. In addition, similar emulsions can be made using molybdate compounds or molybdenum compounds as a complexing agent, replacing the Borax used above.

Typical composition ranges for the compositions of the present invention are provided in Table 2 below.

TABLE 2

TYPICAL COMPOSITION RANGES

| Component | Typical Amount (% weight basis) |
|---|---|
| First Wax | 25-40 |
| Saponifiable Wax | 2.5-4.5 |
| Alkyl Phenol | 0.25-10.0 |
| Polynaphthalenesulfonic Acid | 0.25-5.0 |
| Water | 55-65 |
| Starch + Complexing Agent (4:1 to 20:1) | 1.5-3.5 |
| Alkali Metal Hydroxide | Amount used depends on amount of saponifiable wax; typically 0.5-1.5 |

Comparative Multiple Wax Systems:

An emulsion can be formed by combining and homogenizing two waxes, a co-surfactant, an alkyl phenol and a complexed starch. Table 3 below provides examples of emulsions made according to this embodiment. Also, there is provided results of testing the gypsum/emulsion mixture and gypsum product. All mixtures and homogenizations were made, and tests were performed, as described above.

TABLE 3

COMPARATIVE MULTIPLE WAX SYSTEMS

| Component/ Parameter | (amount of component, grams) | | | Control (no emulsion) |
|---|---|---|---|---|
| | Emulsion E | Emulsion F | Emulsion G | |
| Wax 3816 | 134.0 | 132.0 | 130.0 | |
| Montan Wax | 12.0 | 12.0 | 12.0 | |
| 319H | 10.0 | 4.0 | 6.0 | |
| Sodium lignosulfonate | 4.0 | 4.0 | 4.0 | |
| Water | 239.0 | 237 | 237 | |
| Borax | 1.5 | 1.5 | 1.5 | |
| Corn Starch | 6.5 | 6.5 | 6.5 | |
| KOH | 3.0 | 3.0 | 3.0 | |
| % Water Retained | 1.07 | 7.76 | -0.34 | 33.30 |
| Fluidity | 3 inches | 3.25 inches | 3.25 inches | 4 inches |

Wax 3816 is a hard paraffin wax, available from Honeywell/Astor, Duluth, Ga. In the emulsions described in Table 3, corn starch is complexed with sodium tetraborate decahydrate. Montan wax was saponified in situ by the addition of potassium hydroxide (KOH). Alternatively, the complexing agent can be another useful borate compound, or a molybdate compound or a molybdenum compound.

Comparative Single Wax Systems

An emulsion can be formed by combining and homogenizing a single wax, a dual surfactant system, an alkyl phenol and a complexed starch. Table 4 below provides examples of emulsions made according to this embodiment. Also, there is provided results of testing the gypsum/emulsion mixture and gypsum product. All mixtures and homogenizations were made, and tests were performed, as described above.

TABLE 4

COMPARATIVE SINGLE WAX SYSTEMS

| Component/ Parameter | (amount of component, grams) | | | Control |
|---|---|---|---|---|
| | Emulsion J | Emulsion K | Emulsion L | |
| Wax 3816 | 135.0 | 134.5 | 134.5 | |
| 319H | 4.0 | 4.0 | 4.0 | |
| Ethox 2914 | 14.0 | 12.0 | 12.0 | |
| SD1121 | 4.0 | 4.0 | 4.0 | |
| Water | 240.0 | 240.0 | 240.0 | |
| Borax | 0.5 | 0.5 | 0.5 | |
| Corn Starch | 2.5 | 5.0 | 5.0 | |
| % Water Retained | 1.24 | -0.02 | 3.47 | 33.30 |

As illustrated in Table 4 above, a combination of a single wax, a dual surfactant system, an alkyl phenol and a complexed starch significantly reduces the amount of water absorbed by the gypsum product. Alternatively, the complexing agent can be another useful borate compound, or a molybdate compound or a molybdenum compound.

The use of borates or trisodium phosphate in emulsions imparts two additional benefits to the gypsum products employing such emulsions. For example, borates and trisodium phosphate are useful as fire retardant compounds and these compounds are natural biocides. Therefore, incorporation of a fire retardant compound into a gypsum product can present certain advantages to the users of these gypsum products. Also, the emulsions of the present invention do not require the further addition of another biocide to prevent bacterial growth in the emulsions.

Table 5 illustrates performance advantages achieved with certain embodiments of the present invention. Water absorption tests were performed according to the procedures described above.

TABLE 5

EXPERIMENTAL RESULTS

| Molybdate or Molybdenum Compound or Blank | % Water Absorption |
|---|---|
| Blank | 27.61 |
| Sodium Molybdate Dihydrate | 4.30 |
| Ammonium Heptamolybdate | −0.09 |
| Ammonium Dimolybdate | 4.33 |
| Molybdenum Disulfide | −0.05 |

The experimental results demonstrate an improved emulsion for use in gypsum compositions. The improved emulsion unexpectedly reduces the amount of water absorbed by test specimens by an order of magnitude. Through the use of a polynaphthalenesulfonic acid, lignin compounds and biocides can be eliminated from gypsum formulations. The elimination of these two compounds improves the manufacture and cost of the gypsum compositions using the emulsions of the present invention.

There has been disclosed in accordance with the principles of the present invention an emulsion and gypsum product made using such an emulsion. The emulsion is useful in imparting water-resistance to the gypsum product. While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An emulsion useful in providing water-resistance to a gypsum product, comprising:
    at least one wax;
    an alkyl phenol;
    polynaplithalensulfonic acid;
    an alkali metal hydroxide;
    water; and a complexed starch;
    wherein the alkyl phenol is a $C_{24}$-$C_{34}$ polymerized methylene-coupled alkyl phenol.

2. The emulsion of claim 1 wherein the alkali metal hydroxide is selected from the group consisting of sodium hydroxide and potassium hydroxide.

3. The emulsion of claim 1 wherein the complexed starch is a complex or a starch and a complexing agent selected from the group consisting of a borate compound, a molybdate compound and a molybdenum compound.

4. The emulsion of claim 3 wherein the complexing agent is sodium tetraborate decahydrate.

5. The emulsion of claim 3 wherein the starch is selected from the group consisting of unmodified starch, acid-modified starch, hydroxyethylated starch, oxidized starch, and cationic starch.

6. The emulsion of claim 3 wherein the starch is acid-modified starch.

7. The emulsion of claim 3 wherein the ratio of the complexing agent to the starch on a weight per weight basis is from about 1:4 to about 1:20.

8. A method for making an emulsion useful in providing water-resistance to a gypsum product, comprising the steps of:
    (a) at least one wax and an alkyl phenol to provide a first pre-mix;
    (b) mixing polynaphthalenesulfonic acid, an alkali metal hydroxide, water, and a complexed starch to provide a second pre-mix;
    (c) combining the first pre-mix and the second pre-mix to provide a mixture; and
    (d) homogenizing the mixture;
    wherein the alkyl phenol is a $C_{24}$-$C_{34}$ polymerized methylene-coupled alkyl phenol.

9. The method of claim 8 wherein the alkali metal hydroxide is selected from the group consisting of sodium hydroxide and potassium hydroxide.

10. The method of claim 8 wherein steps (a) and (b) further comprise heating the first pre-mix and second pre-mix to a temperature range of about 185° F. to about 195° F.

11. The method of claim 8 wherein step (d) is carried out at a pressure of at least 3500 psi.

12. The method of claim 8 wherein the complexed starch is a complex of a starch and a complexing agent selected from the group consisting of a borate compound, a molybdate compound and a molybdenum compound.

13. The method of claim 12 wherein the complexing agent is sodium tetraborate decahydrate.

14. The method of claim 13 wherein the starch is selected from the group consisting of unmodified starch, acid-modified starch, hydroxyethylated starch, oxidized starch, and cationic starch.

15. The method of claim 13 wherein the starch is acid-modified starch.

16. The method of claim 13 wherein the ratio of the complexing agent to the starch on a weight per weight basis is from about 1:4 to about 1:20.

17. An emulsion useful in providing water-resistance to a gypsum product, comprising;
    at least one wax in an amount of about 25% to about 40% by weight based on the total weight of the emulsion;
    a saponifiable wax in an amount of about 2.5% to about 4.5% by weight based on the total weight of the emulsion;
    an alkyl phenol in an amount of about of about 0.25% to about 10.0% by weight based on the total weight of the emulsion;
    a polynaphthalenesulfonic acid in an amount of about 0.25% to about 5.0% by weight based on the total weight of the emulsion;
    water in an amount of about 55% to about 65% by weight based on the total weight of the emulsion;
    an alkali metal hydroxide in an amount or about 0.5% to about 1.5% by weight based on the total weight of the emulsion; and
    a complexed starch, in an amount of about 1.5% to about 3.5% by weight based on the total weight of the emulsion, the complexed starch comprising a starch and a complexing agent selected from the group consisting or a borate compound, a molybdate compound and a molybdenum compound, the starch and the complexing agent having a ratio, by weight, of about 4:1 to about 20:1;
    wherein the alkyl phenol is a $C_{24}$-$C_{34}$ polymerized methylene-coupled alkyl phenol.

18. A gypsum product comprising gypsum and the emulsion of claim 1.

19. A gypsum product comprising gypsum and the emulsion of claim 17.

20. A method for imparting water-resistance to a gypsum product comprising the addition to a gypsum product of an emulsion of claim 1.

21. A method of imparting water resistance to a gypsum product comprising the addition to a gypsum product of an emulsion of claim 17.

* * * * *